(12) United States Patent
Beattie

(10) Patent No.: US 6,892,533 B2
(45) Date of Patent: May 17, 2005

(54) AUTOMATIC TRANSMISSION

(76) Inventor: James C. Beattie, 6747 Whitestone Rd., Baltimore, MD (US) 21207

( * ) Notice: Subject to any disclaimer, the term of this patent is extended or adjusted under 35 U.S.C. 154(b) by 6 days.

(21) Appl. No.: 10/670,248

(22) Filed: Sep. 26, 2003

(65) Prior Publication Data

US 2005/0066653 A1    Mar. 31, 2005

(51) Int. Cl.$^7$ .............................................. F16D 33/00
(52) U.S. Cl. ........................................ 60/339; 60/362
(58) Field of Search ..................... 60/330, 339, 362

(56) References Cited

U.S. PATENT DOCUMENTS 4,949,821 A * 8/1990 Murota et al. ................. 60/339
4,974,715 A * 12/1990 Koyama ..................... 192/3.29
6,564,914 B1 * 5/2003 Glock et al. ................... 60/330

* cited by examiner

Primary Examiner—Thomas E. Lazo
(74) Attorney, Agent, or Firm—Harbin King & Klima

(57) ABSTRACT

An automatic transmission includes a stator support shaft having an internal axial bore for receiving an input shaft, a forward engagement portion for engaging a stator of a torque converter, and a central engagement portion for engaging a stator support and transferring to the stator support substantially all of a torque load imposed on the stator support shaft by the stator. A rearward portion of the stator support shaft is positioned rearward of the central engagement portion. An oil seal groove is positioned in the internal axial bore of the rearward portion to receive an oil seal to seal between the stator support shaft and the input shaft.

15 Claims, 4 Drawing Sheets

AUTOMATIC TRANSMISSION

BACKGROUND OF THE INVENTION

The present invention is related to an automatic transmission and, in particular, to the input shaft and stator support shaft of an automatic transmission.

In a typical automatic transmission, such as for instance, a General Motors Powerglide transmission, a power input shaft 10 (see FIG. 1 (PRIOR ART)) includes an oil gallery 12 running axially through an interior of the input shaft 10 which is part of the oil management system of the transmission. The input shaft is positioned to rotate within an internal axial bore 22 of the stator support shaft 20. The input shaft includes a generally radial oil flow bore 14 connecting an exterior of the input shaft to the input shaft oil gallery 12. To provide control of the oil flow between the stator support shaft and the input shaft, it is necessary to provide two oil seals 16 and 18 between the input shaft 10 and the stator support shaft 20, positioned axially forward and rearward of the input shaft oil flow bore 14, respectively. The oil seals 16 and 18 are generally in the form of split metal rings so that they can be expanded to install over larger diameter portions of the input shaft 10.

The stator support shaft 20 includes two axially separated generally radial oil flow bores 24 and 26 connecting an exterior of the stator support shaft 20 to the internal axial bore 22 of the stator support shaft 20. The forward stator support shaft oil flow bore 24 is positioned axially forward of the forward input shaft oil seal 16 and the rearward stator support shaft oil flow bore 26 is positioned axially between the forward input shaft oil seal 16 and rearward input shaft oil seal 18 to be in generally axial alignment with the input shaft oil flow bore 14.

The oil flow is as follows. Hot oil flows from the torque converter 36 in the forward chamber 38 created between the stator support shaft 20 and the input shaft 10 to be blocked by the forward oil seal 16 and forced through the forward stator support shaft oil flow bore 24 to the oil cooler 30. The oil is then returned from the oil cooler 30 to the rearward stator support shaft oil flow bore 26 and into the chamber 40 created between the stator support shaft 20, the input shaft 10 and the two oil seals 16 and 18. The oil is then forced through the input shaft oil flow bore 14 to the input shaft oil gallery 12 where it can then be directed to further oil flow bores in the input shaft for cooling and lubrication of the direct clutches, the planetary gear set, the rear thrust washer and the input shaft pilot bushing. Each of the oil flow bores is critically sized to provide a desired downstream restriction to the oil flow and maintain the desired operating oil pressure in the torque converter for proper operation of the transmission.

In a standard Powerglide transmission, the oil seals 16 and 18 are positioned in circumferential oil seal grooves 32 and 34, respectively, cut into the exterior of the input shaft 10 on each side of the input shaft oil flow bore 14. Each oil seal groove 32, 34 then receives an oil seal 16, 18 that engages the internal axial bore 22 of the stator support shaft 20 to provide a sealing engagement between the input shaft 10 and the stator support shaft 20. The input shaft 10 includes turbine splines 42 at a forward end for engaging the turbine of the torque converter 36. The stator support shaft 20 includes stator splines 42 at a forward end for engaging the stator of the torque converter 36 and stator support splines at a central portion for engaging the stator support and preventing rotation of the stator support shaft 20.

Such a transmission has disadvantages however. The General Motors Powerglide transmission was originally developed for vehicles generally producing significantly less than 300 horsepower. Although no longer in original equipment production, the Powerglide transmission is now one of the most popular automatic transmissions used in drag racing vehicles. The power that these vehicles produce is often well in excess of 500 horsepower and can be in excess of 1500 horsepower. The additional torque produced by the engines of these vehicles is compounded by the fact that the torque converter 36 multiplies the torque of the engine, generally by as much as a factor of two or more, under low speed/high engine torque output conditions. Thus, this additional torque and power, coupled with the increased traction resulting from large, modern drag racing tires, places stresses on the transmission that were never envisioned in the original design.

As a result, the input shaft 10 has become a weak link in the transmission. In particular, the circumferential input shaft oil seal grooves 32 and 34 for receiving the oil seals 16 and 18 not only decrease the cross-sectional area and strength of the input shaft 10, they also create stress risers that can hasten input shaft failure such that input shaft breakage at one of the circumferential oil seal grooves has become commonplace in such transmissions used in high horsepower drag racing vehicles.

One approach to this input shaft breakage problem has been to forego the circumferential oil seal grooves and oil seals between the input shaft and the stator support shaft. This reduces power input shaft breakage but also reduces control of the oil flow with significant undesirable effects. For instance, since the oil is not properly routed as discussed above, torque converter discharge oil is allowed to enter the front of the transmission and is not effectively routed to the oil cooler and then to specific areas of the transmission for cooling and lubrication. Further, because of the loss of the restrictions in the oil flow caused by the sized oil flow bores in the standard Powerglide transmission, the torque converter internal oil pressure cannot be effectively maintained for proper operation.

Another approach to the shaft breakage problem has been to increase the diameter of at least a portion of the input shaft 10 to minimize or eliminate the cross-sectional area reduction of the shaft, as compared to a standard shaft, caused by the circumferential oil seal grooves 32, 34. However, such an approach requires that other non-standard components be used to accommodate the increased size of the input shaft. For instance, the stator support shaft in such a transmission must have a larger diameter internal axial bore to accommodate the increased input shaft size and larger oil sealing rings. In addition to requiring such additional custom components at increased cost, the wall thickness of the stator support shaft is decreased by the larger internal axial bore, thereby compromising the strength of the stator support shaft. Further, the stress risers created by the oil seal grooves may not be completely eliminated by the increase in the input shaft diameter.

It is an object of the present invention to provide an automatic transmission that overcomes the above disadvantages.

It is a further object of the present invention to provide an automatic transmission having increased power handling capabilities.

It is a further object of the present invention to provide an automatic transmission having increased power handling capabilities while maintaining proper oil flow in the transmission.

It is a further object of the present invention to provide an input shaft for an automatic transmission that is stronger than a standard input shaft while retaining the proper oil flow in the transmission.

It is a further object of the present invention to provide an input shaft for an automatic transmission having an increased diameter for additional strength without eliminating oil control seals between the input shaft and the stator support shaft.

SUMMARY OF THE INVENTION

An automatic transmission of the present invention includes an input shaft having a forward engagement portion for engaging a turbine of a torque converter and a first oil seal>It also includes a stator support shaft having an internal axial bore for receiving the input shaft, a forward engagement portion for engaging a stator of the torque converter of the automatic transmission and a central engagement portion for engaging a stator support of the automatic transmission and transferring to the stator support substantially all of a torque load imposed on the stator support shaft by the stator. A rearward portion of the stator support shaft is positioned rearward of the central engagement portion. A first internal circumferential oil seal groove is positioned in the internal axial bore of the rearward portion to receive the first oil seal for establishing a sealing engagement between the stator support shaft and the input shaft and for blocking an axial flow of oil between the stator support shaft and the input shaft originating from the torque converter.

The stator support shaft can further include a first oil flow bore connecting the axial internal bore with an exterior of the shaft for allowing the oil from the torque converter flowing between the stator support shaft and the input shaft to flow to an exterior of the stator support shaft and to an oil cooler of the automatic transmission with the first oil flow bore positioned on the rearward portion of the stator support shaft forward of the first oil seal groove.

The automatic transmission can further include a second oil seal and a second internal circumferential oil seal groove positioned in the internal axial bore of the rearward portion of the stator support shaft rearward of the first oil seal groove to receive the second oil seal for establishing a sealing engagement between the stator support shaft and the input shaft and creating an oil chamber between the stator support shaft, the input shaft and the first oil seal. The stator support shaft can further include a second oil flow bore connecting the axial internal bore with an exterior of the shaft for allowing oil to flow from an oil cooler exterior of the shaft to the interior axial bore, the second oil flow bore positioned axially on the stator support shaft between the first and second oil seal grooves.

Since the oil seal grooves are positioned rearward of the central engagement portion which receives no significant torque load from the stator, the grooves do not significantly weaken the stator support shaft, in contrast to the grooves 32 and 34 of the prior art input shaft 10, where the grooved portion of the shaft can generally expect to encounter at least twice the torque output of the engine during routine operation.

With the present invention, the automatic transmission has increased power handling capabilities while maintaining proper oil flow in the transmission. The input shaft can have an increased diameter as compared to a standard input shaft for additional strength without eliminating oil control seals between the input shaft and the stator support shaft. The stator support shaft and input shaft of the present invention can be used in an automatic transmission without requiring modification of other components of the transmission.

Further objects and advantages of the present invention will be apparent from the description of the invention below read in conjunction with the accompanying Figures, wherein like reference numerals indicate like components.

DETAILED DESCRIPTION

Figure 1:
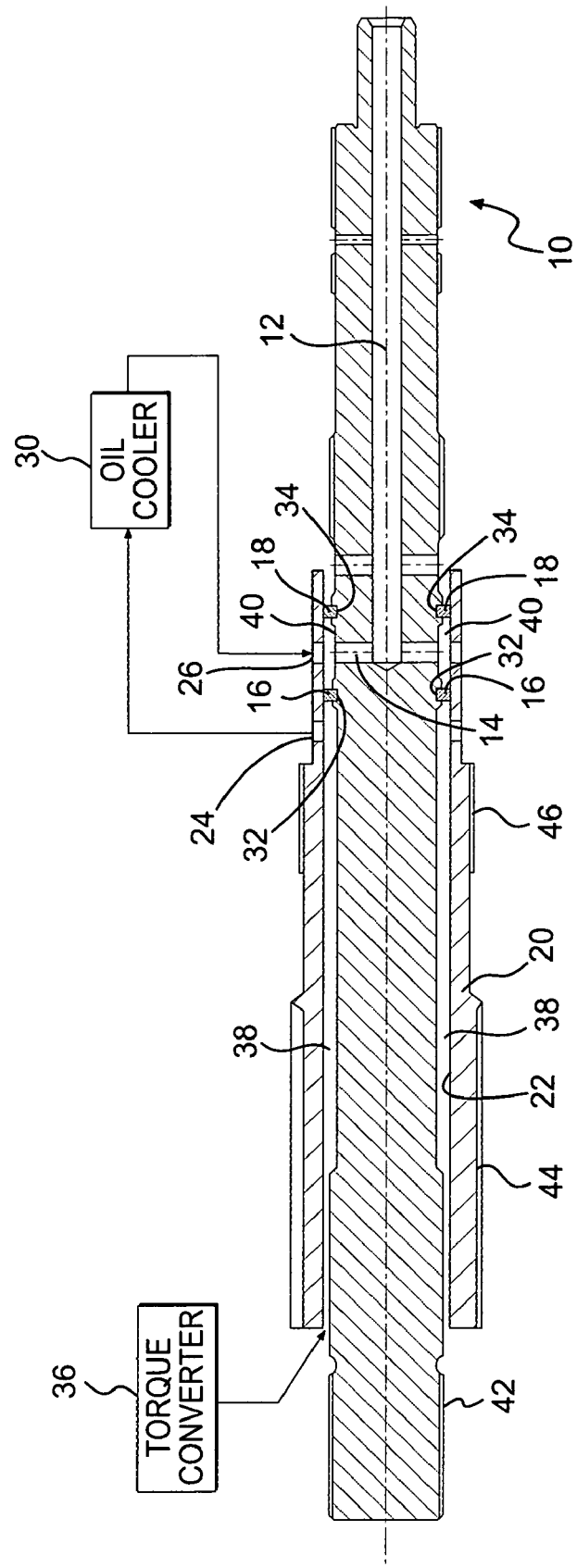
FIG. 1 (PRIOR ART) shows a sectional view of a conventional input shaft and stator support shaft for an automatic transmission.
Figure 2:
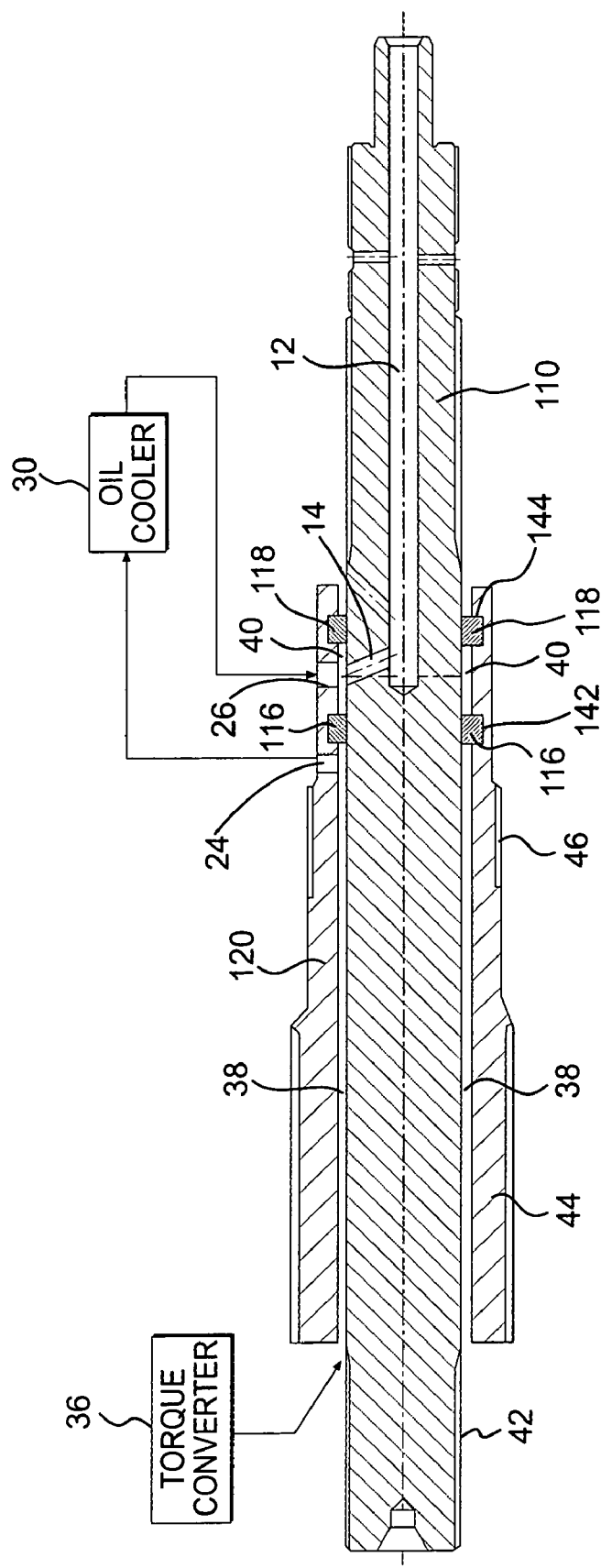
FIG. 2 shows a sectional view of an input shaft and stator support shaft for an automatic transmission according to the present invention.
Figure 3:
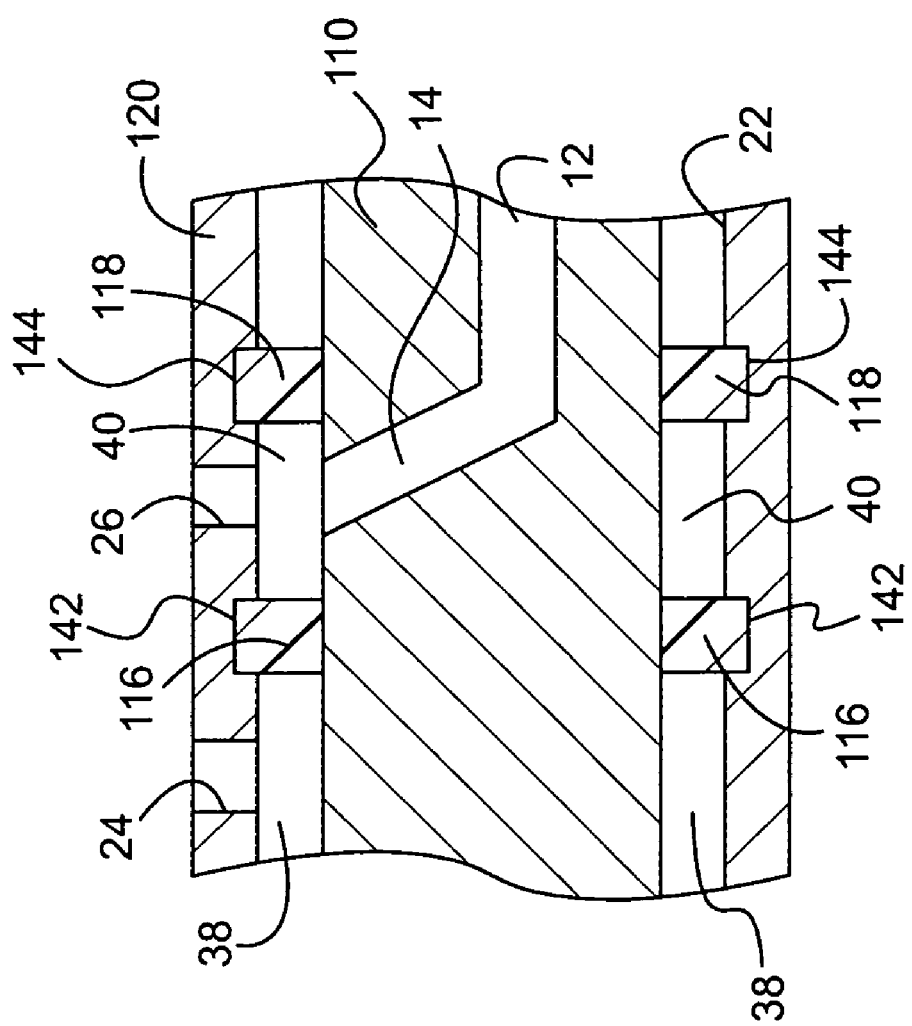
FIG. 3 shows an enlarged partial sectional view of the input shaft and stator support shaft of FIG. 2.
Figure 4:
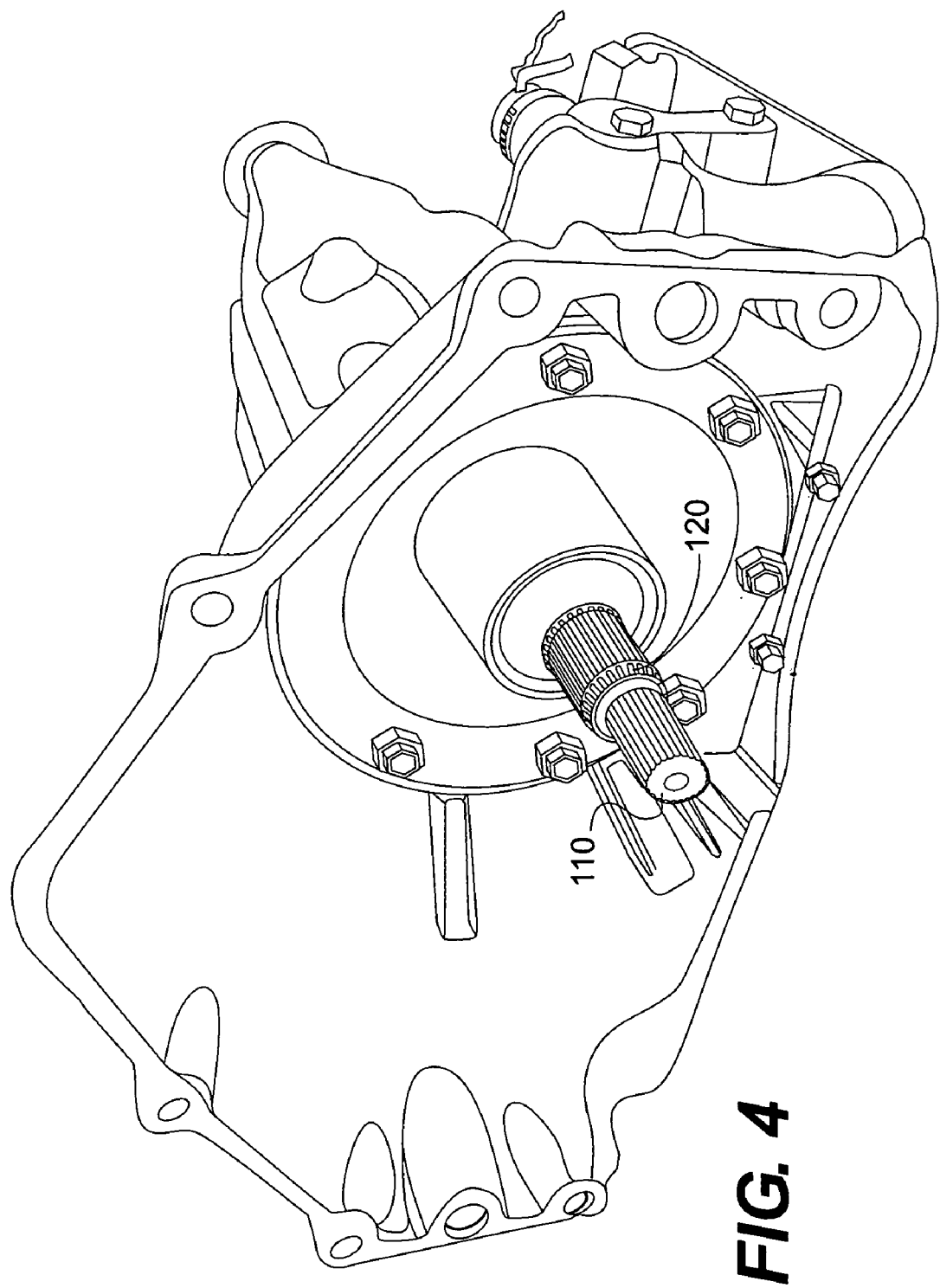
FIG. 4 shows a perspective view of an automatic transmission incorporating the input shaft and stator support shaft of the present invention.

An input shaft 110 and stator support shaft 120 of the present invention is shown in FIGS. 2 and 3. The input shaft 110 does not include oil seal grooves 32 and 34. Therefore, the diameter of the input shaft in at least the area of the chamber 40 can be increased and the stress risers caused by the oil seal grooves 32 and 34 eliminated. The stator support shaft 120 is provided with a forward oil seal groove 142 and a rearward oil seal groove 144 positioned on internal axial bore 22 of the stator support shaft to flank the rearward oil flow bore 26 and input shaft oil flow bore 14 when the stator support shaft 120 is assembled to the input shaft 110. The relative axial positioning of the oil flow bores 14, 24 and 26 is preferably, but not necessarily, the same in the present invention as in the prior art shown in FIG. 1. Likewise, the relative axial positioning in the automatic transmission of the oil seal grooves 142 and 144 is preferably, though not necessarily, the same in the present invention as the oil seal grooves 32 and 34 of the prior art shown in FIG. 1.

Oil seals 116 and 118 are respectively positioned in oil seal grooves 142 and 144 and provide a sealing contact between the stator support shaft 120 and the input shaft 110 to block off chamber 38 and create chamber 40. In the preferred embodiment, the oil seals 116 and 118 are annular in shape, constructed of Teflon and are somewhat flexible so that they can be easily inserted into the axial bore 22 and seated in the respective oil seal grooves 142 and 144. In a preferred embodiment, the Teflon rings have designation number AS568A-022, having dimensions of 1" inner diameter, 1.125" outer diameter and 0.0625" cross-section. The oil seal grooves 142 and 144 have appropriate dimensions to receive and support the oil seals 116 and 118, which in the case of the above noted dimensions for the oil seals, is preferred to be 0.060" deep and 0.077" wide. These dimensions are given as examples only and are not intended to limit the use of other dimensions in components of the invention.

The oil flow is the same as in the prior art transmission shown in FIG. 1. That is, hot oil flows from the torque converter 36 in the forward chamber 38 created between the stator support shaft 120 and the input shaft 110 to be blocked by the forward oil seal 116 and forced through the forward stator support shaft oil flow bore 24 to the oil cooler 30. The oil is then returned from the oil cooler 30 to the rearward stator support shaft oil flow bore 26 and into the chamber 40 created between the stator support shaft 120, the input shaft 110 and the two oil seals 116 and 118. The oil is then forced through the input shaft oil flow bore 14 to the input shaft oil gallery 12 where it can then be directed to further oil flow bores in the input shaft for cooling and lubrication of the direct clutches, the planetary gear set, the rear thrust washer and the input shaft pilot bushing. Each of the oil flow bores is critically sized to provide a desired downstream restriction to the oil flow and maintain the desired operating oil pressure in the torque converter 36 for proper operation of the transmission.

The engagement of the stator support splines 46 of the stator support shaft 120 with the stationary stator support assures that all (or nearly all) of the torque load placed on the stator support shaft 120 by the stator of the torque converter 36 is imparted on the stator support. No torque load is placed on the stator support shaft 120 rearward of the stator support splines 46 by the stator. The only torque load imposed on the this rearward portion of the stator support shaft 120 is from drag imposed by the oil seals 116 and 118 contacting the rotating input shaft 110. Therefore, although the grooves 142 and 144 are cut into the stator support shaft 120, they do not significantly weaken the stator support shaft 120 because they are positioned rearward of the stator support splines 46 where there is no significant torque loading. This is in contrast to the grooves 32 and 34 of the prior art input shaft 10, where the grooved portion of the shaft can generally expect to encounter at least twice the torque output of the engine during routine operation.

With the present invention, the above noted objectives are met. That is, the automatic transmission has increased power handling capabilities while maintaining proper oil flow in the transmission. The input shaft 110 has an increased diameter as compared to a standard input shaft for additional strength without eliminating oil control seals between the input shaft 110 and the stator support shaft 120. The stator support shaft 120 and input shaft 110 of the present invention can be used in an automatic transmission without requiring modification of other components of the transmission.

A portion or the entire stator support shaft 120 of the present invention can be a separate component or components from the stator support of the automatic transmission or can be incorporated as integral parts of the stator support.

The present invention can be used with automatic transmissions other than a General Motors Powerglide transmission. It is also intended that the invention can be used with respect to other shafts or components in all areas of an automatic transmission or hydraulically operated machine.

The Figures shown herein are not to scale.

What is claimed is:

1. A stator support shaft for an automatic transmission, comprising:
    an internal axial bore for receiving an input shaft;
    a forward engagement portion for engaging a stator of a torque converter of the automatic transmission;
    a central engagement portion for engaging a stator support of the automatic transmission and transferring to the stator support substantially all of a torque load imposed on the stator support shaft by the stator;
    a rearward portion positioned rearward of the central engagement portion; and
    a first internal circumferential oil seal groove positioned in the internal axial bore of the rearward portion, the first oil seal groove constructed and arranged to receive a first oil seal for establishing a sealing engagement between the stator support shaft and the input shaft and for blocking an axial flow of oil between the stator support shaft and the input shaft originating from the torque converter.

2. The stator support shaft as in claim 1, and further comprising:
    a first oil flow bore connecting the axial internal bore with an exterior of the shaft for allowing the oil from the torque converter flowing between the stator support shaft and the input shaft to flow to an exterior of the stator support shaft, the first oil flow bore positioned on the rearward portion of the stator support shaft forward of the first oil seal groove.

3. The stator support shaft as in claim 2, and further comprising:
    a second internal circumferential oil seal groove positioned in the internal axial bore of the rearward portion of the stator support shaft rearward of the first oil seal groove, the second oil seal groove constructed and arranged to receive a second oil seal for establishing a sealing engagement between the stator support shaft and the input shaft and creating an oil chamber between the stator support shaft, the input shaft and the first oil seal.

4. The stator support shaft as in claim 3, and further comprising:
    a second oil flow bore connecting the axial internal bore with an exterior of the shaft for allowing oil to flow from an exterior of the shaft to the interior axial bore, the second oil flow bore positioned axially on the stator support shaft between the first and second oil seal grooves.

5. The stator support shaft as in claim 4, wherein the oil chamber is axially positioned to connect to an oil flow bore positioned in the input shaft and pass oil from the exterior of the stator support shaft to the input shaft oil flow bore.

6. The stator support shaft as in claim 5, and further comprising:
    the first oil seal and the second oil seal.

7. An automatic transmission, comprising:
    an input shaft having a forward engagement portion for engaging a turbine of a torque converter;
    a first oil seal;
    a stator support shaft, comprising:
        an internal axial bore for receiving the input shaft;
        a forward engagement portion for engaging a stator of the torque converter of the automatic transmission;
        a central engagement portion for engaging a stator support of the automatic transmission and transferring to the stator support substantially all of a torque load imposed on the stator support shaft by the stator;
        a rearward portion positioned rearward of the central engagement portion; and
        a first internal circumferential oil seal groove positioned in the internal axial bore of the rearward portion, the first oil seal groove constructed and arranged to receive the first oil seal for establishing a sealing engagement between the stator support shaft and the input shaft and for blocking an axial flow of oil between the stator support shaft and the input shaft originating from the torque converter.

8. The automatic transmission as in claim 7, wherein the stator support shaft further comprises:
    a first oil flow bore connecting the axial internal bore with an exterior of the shaft for allowing the oil from the torque converter flowing between the stator support shaft and the input shaft to flow to an exterior of the stator support shaft and to an oil cooler of the automatic transmission, the first oil flow bore positioned on the rearward portion of the stator support shaft forward of the first oil seal groove.

9. The automatic transmission as in claim 8, and further comprising:

a second oil seal;

a second internal circumferential oil seal groove positioned in the internal axial bore of the rearward portion of the stator support shaft rearward of the first oil seal groove, the second oil seal groove constructed and arranged to receive the second oil seal for establishing a sealing engagement between the stator support shaft and the input shaft and creating an oil chamber between the stator support shaft, the input shaft and the first oil seal.

10. The automatic transmission as in claim 9, wherein the stator support shaft further comprises:

a second oil flow bore connecting the axial internal bore with an exterior of the shaft for allowing oil to flow from an oil cooler exterior of the shaft to the interior axial bore, the second oil flow bore positioned axially on the stator support shaft between the first and second oil seal grooves.

11. The automatic transmission as in claim 10, wherein the input shaft includes an oil flow bore and the oil chamber is axially positioned to connect to the input shaft oil flow bore and pass oil from the exterior of the stator support shaft to the input shaft oil flow bore.

12. The automatic transmission as in claim 11, wherein an external portion of the input shaft positioned between and near the first and second oil seals is free of any substantive grooving.

13. The automatic transmission as in claim 12, and further comprising the torque converter.

14. The automatic transmission as in claim 9, wherein an external portion of the input shaft positioned between and near the first and second oil seals is free of any substantive grooving.

15. The automatic transmission as in claim 7, and further comprising the torque converter.

\* \* \* \* \*